United States Patent [19]

Wilkinson et al.

[11] Patent Number: 4,766,602
[45] Date of Patent: Aug. 23, 1988

[54] SYNCHRONIZING SIGNAL DECODING

[75] Inventors: James H. Wilkinson, Yokohama; Roger Lagadec, Atsugi, both of Japan

[73] Assignee: Sony Corporation, Tokyo, Japan

[21] Appl. No.: 18,209

[22] Filed: Feb. 24, 1987

[30] Foreign Application Priority Data

Feb. 27, 1986 [GB] United Kingdom ............... 8604886

[51] Int. Cl.[4] ............................................. H04L 7/08
[52] U.S. Cl. ...................................... 375/116; 328/72
[58] Field of Search ................ 375/95, 106, 110, 111, 375/114, 116; 360/51; 328/72, 74; 307/269, 516; 370/100, 105, 106, 118

[56] References Cited

U.S. PATENT DOCUMENTS

| 4,035,601 | 7/1977 | Isaacs | 375/116 |
| 4,280,224 | 7/1981 | Chethik | 375/116 |
| 4,425,646 | 1/1984 | Kinoshita et al. | 375/118 |
| 4,453,260 | 6/1984 | Inagawa et al. | 370/105 |
| 4,620,300 | 10/1986 | Ogawa | 375/106 |

Primary Examiner—Benedict V. Safourek
Attorney, Agent, or Firm—Lewis H. Eslinger; Jay H. Maioli

[57] ABSTRACT

A method of decoding digital synchronizing signals each of which consists of a plurality of bits in a predetermined pattern, the intervals between the starts of successive synchronizing signals in an input digital signal being variable over a range, comprises ascertaining the bit period distance between the starts of two successive synchronizing signals, subsequently searching the input digital signal for the pattern using a window comprising the bit period distance, which window is varied in position if the bit period distance changes, and supplying an output synchronizing pulse in synchronism with subsequent synchronizing signals found in the window.

6 Claims, 1 Drawing Sheet

SYNCHRONIZING SIGNAL DECODING

BACKGROUND OF THE INVENTION

1. Field of the Invention

This invention relates to synchronizing signal decoding. More particularly, the invention relates to methods and apparatus for decoding a digital synchronizing signal.

2. Description of the Prior Art

We have recently proposed (UK patent application no. 8604687 filed Feb. 26, 1986) a modification to the AES/EBU (Audio Engineering Society/European Broadcasting Union) format for serial transmission of audio data, in which modification of the channel status information words are in socalled free-format, that is, the number of bits in each channel status information word may vary within limits from one channel status information word to the next. The above-mentioned proposal may be likewise applied to the words comprising the user bits, but for simplicity we will, throughout this specification, refer mainly to the channel status information words. The proposal gives rise to a particular problem at the decoder, because although each of the synchronizing signals forming part of the channel status information words consists of a fixed number of bits in a predetermined pattern, the synchronizing signals do not necessarily occur at fixed intervals.

To maintain low redundancy, the modified format uses synchronizing signals consisting of sixteen bits, and these are associated with the remainder of the channel status information word, which at a minimum may consist of a further 40 bits. The probability of the 16-bit synchronizing signal pattern occurring in a 40-bit block is 1 in $25/2^{16}$; which represents about 0.04% chance. This is unacceptable, and the known technique of locking to the synchronizing signals only when two successive synchronizing signals have been successfully decoded is therefore used. However, this known technique has hitherto only been applied where the synchronizing signals occur at fixed intervals.

SUMMARY OF THE INVENTION

One object of the present invention is to provide a method of decoding digital synchronizing signals separated by variable intervals.

Another object of the present invention is to provide apparatus for decoding digital synchronizing signals separated by variable intervals.

According to the present invention there is provided a method of decoding digital synchronizing signals each of which consists of a plurality of bits in a fixed pattern, wherein the intervals between the starts of successive said synchronizing signals in an input digital signal are variable over a range of P plus or minus Q bit periods; the method comprising:

ascertaining the bit period distance between the starts of two successive said synchronizing signals;

subsequently searching said input digital signal for said pattern using a window comprising said bit period distance, which window is varied in position if said bit period distance changes; and supplying an output synchronizing pulse in synchronism with subsequent said synchronizing signals found in said window.

According to the present invention there is also provided apparatus for decoding digital synchronizing signals each of which consists of a plurality of bits in a fixed pattern, wherein the intervals between the starts of successive said synchronizing signals in an input digital signal are variable over a range of P plus or minus Q bit periods;

the apparatus comprising:

means for ascertaining the bit period distance between the starts of two successive said synchronizing signals;

means for subsequently searching said input digital signal for said pattern using a window comprising said bit period distance, which window is varied in position if said bit period distance changes; and means for supplying an output synchronizing pulse in synchronism with subsequent said synchronizing signals.

The above, and other objects, features and advantages of this invention will be apparent from the following detailed description of illustrative embodiments which is to be read in connection with the accompanying drawings.

DESCRIPTION OF THE PREFERRED EMBODIMENTS

Before describing the embodiment, an example will be described of a situation in which it is necessary to decode a digital synchronizing signal which occurs at intervals which may vary.

Hitherto, in the AES/EBU format for the serial transmission of audio data, 192-bit words of channel status information have been transmitted. The channel status information bits are referred to as C-bits. The audio signal to be transmitted in sampled at 48 kHz and is coded into 32-bit audio data words, each of which in fact consists of a 4-bit frame synchronizing signal, four auxiliary bits, twenty bits of audio data, and a further group of four bits consisting of a validity bit, a user bit, a C-bit and a parity bit. The bits are recorded according to the bi-phase mark rule, except for the 4-bit synchronizing signals, which violate the rule, and are so recognizable on decoding. The 4-bit synchronizing signals enable the 32-bit audio data words to be identified and correctly framed on reception, and in the abovedescribed format, enable the C-bits to be extracted and correctly framed, by virtue of the first synchronizing signal in each sequential group of 192 being different. The C-bits from 192 successive 32-bit audio data words form one of the above-mentioned 192-bit words of channel status information. Briefly, such channel status information may relate to audio attributes, program attributes and transmission attributes.

Recently we have proposed a modification to the above-described format to give greater resistance to corruption or loss of channel status information such as may occur, for example, where there is a change in the audio sampling rate, or cross-fading or mixing of signals. In this modified format, which basically affects only the channel status information (but may likewise be applied to the user bits), each of the 192-bit words of channel status information are divided serially into three 64-bit words, so that the refresh rate of the channel status information is 750 Hz. Moreover, the 64-bit length of the channel status information words is in this modified format only a nominal length, the actual number of bits being variable within narrow limits.

Figure 1:
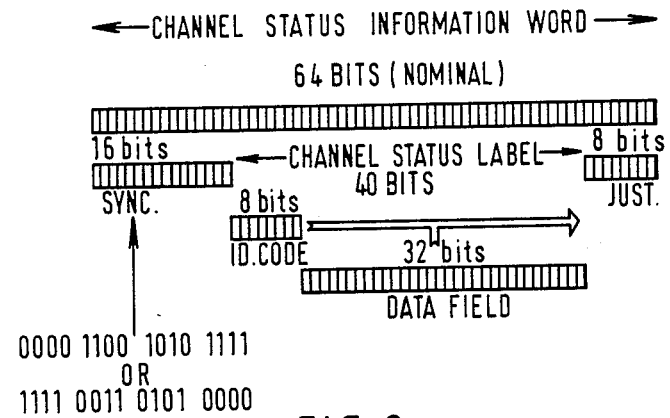
FIG. 1 shows diagrammatically the format of a channel status information word contained in serially transmitted audio data.

FIG. 1 shows the format of a channel status information word. The word consists of a 16-bit synchronizing signal, which, for example, alternates from one channel status information word to the next between the bit patterns 0000 1100 1010 1111 and 1111 0011 0101 0000, which are the inverse (or 2's complement) of each other; an 8-bit identificaiton (ID) code; a 32-bit data field; and normally eight justification bits. The 8-bit ID code and the 32-bit data field together make up one channel status label which contains the variable channel status information. The number of justification bits is eight in normal operation at an audio sampling rate of 48 kHz, but is variable over the range eight plus or minus eight, that is, zero to sixteen, so enabling the refresh rate of the channel status labels to remain unchanged at 750 Hz, even if the audio sampling rate changes. The actual number of bits in a channel status information word may therefore vary within the range 64 plus or minus eight, that is 56 to 72. The justification bits are normally all "0", but may form an error detecting code if extra protection is required.

The synchronizing signal pattern of the form 0000 1100 1010 1111 or its inverse must be searched so as to enable the channel status information words to be correctly framed, but it will be appreciated from the foregoing description that these synchronizing signal patterns will not necessarily occur regularly, but will vary in position plus or minus eight bit periods relative to the normal position.

The present invention is concerned with methods and apparatus for decoding a digital synchronizing signal in circumstances, such as for example those described above, where the intervals between successive synchronizing signals may vary.

Figure 2:
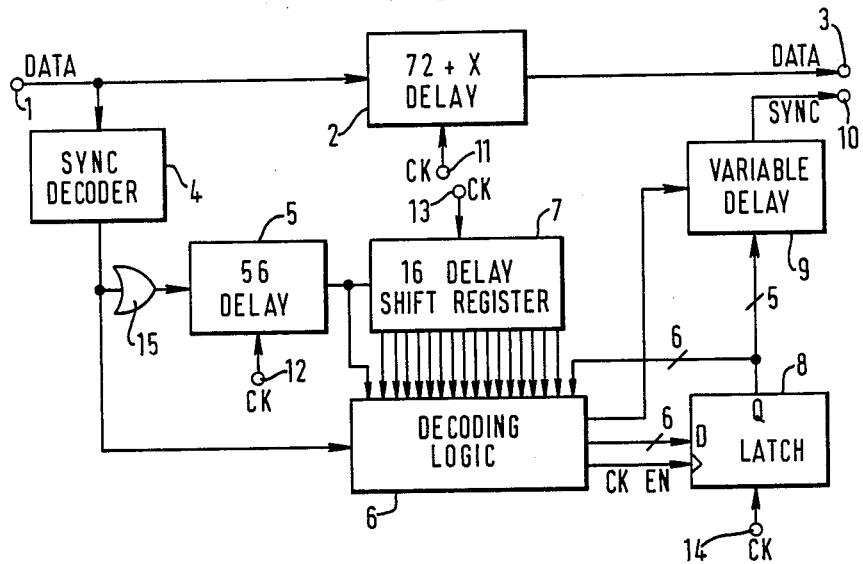
FIG. 2 shows in block form an embodiment of apparatus according to the present invention for decoding a digital synchronizing signal.

Referring to FIG. 2, it is assumed that the channel status information words have been extracted from an incoming digital audio data stream, so that there is supplied to a data input terminal 1 a stream of successive channel status information words, varying in length in the range 56 to 72 bits inclusive and including the 16-bit synchronizing signal pattern.

The input terminal 1 is connected to a first delay device 2 which effects a delay of 72+X bit periods, the output of the first delay device 2 being connected to a data output terminal 3. The input terminal 1 is also connected to a sync decoder 4, comprising a shift register and a programmable read-only memory which supplies a 2-bit signal to an exclusive-OR gate 15 which is connected to a second delay device 5 which effects a delay of 56 bit periods, and also to a decoding logic circuit 6. The 2-bit signal is 00 when no synchronizing signal pattern is recognized, 01 and 10 when the synchronizing signal pattern and the inverse respectively are recognized, and 11 in an invalid situation. The output of the second delay device 5 is connected to the decoding logic circuit 6 and to a third delay device which effects a delay of sixteen bit periods, and is in the form of a 16-bit shift register 7. Sixteen outputs from the respective stages of the shift register 7 are supplied to the decoding logic circuit 6 to give a total of seventeen inputs. The decoding logic circuit 6 supplies a 6-bit output to the D-input of a latch circuit 8, a clock enable signal to the latch circuit 8, and an output sync pulse to a variable delay device 9. The latch circuit 8 supplies from its Q-output a 5-bit sync distance signal to a control input of the decoding logic circuit 6, and to the variable delay device 9. It also supplies an extra sync polarity bit to the decoding logic circuit 6. The variable delay device 9 supplies the output sync pulse from the decoding logic circuit 6 to a sync output terminal 10. Clock pulses at a frequency corresponding to the bit period of the bits of the channel status information words, which frequency it should be noted may vary if there is a variation in the audio sampling rate, are supplied by way of terminals 11, 12, 13 and 14 to the first delay device 2, the second delay device 5, the shift register 7 and the latch circuit 8, respectively.

The operation will now be described.

The basic technique involves finding two successive alternating synchronizing signal patterns, noting the distance between them, and then searching for the next synchronizing signal pattern at that distance plus or minus one bit period. In the present example, the maximum variation in the distance between successive synchronizing signals is one bit period, because tape dynamics limit the maximum variation in a signal reproduced from a magnetic tape to less than that value. In other cases the maximum variation might be more than one bit period, for example, plus or minus Q bit periods relative to a normal distance of P bit periods.

In more detail, the technique comprises first defining a wide sync window of 64 plus or minus eight bit periods, and when the distance between a first two successive alternating synchronizing signals has been found, narrowing the window to that distance plus or minus one bit period. The measured distance, which is variable over a range of sixteen bit periods, is coded by the decoding logic circuit 6 into the 6-bit output supplied to the latch circuit 8, and when enabled by a clock enable signal from the decoding logic circuit 6, indicating that the synchronizing signal pattern has been found, the latch circuit supplies this as the 5-bit sync distance signal to the decoding logic circuit 6 and the variable delay device 9, and the sync polarity bit to the decoding logic circuit 6. The six bits of the sync distance and polarity signals allow for a default value, which is used to indicate start-up.

In the start-up situation, the decoding logic circuit 6 looks at all seventeen inputs for the pulse from the sync decoder 4. When this pulse has been found twice, the 6-bit output indicating the distance between the two pulses and the sync polarity is supplied to the latch circuit 8. Thereafter the decoding logic circuit 6 looks only for the pulse with the correct polarity on that one of the seventeen inputs where the sync distance signal supplied to the decoding logic circuit 6 predicts the pulse to be and at one input on each side of the predicted input. The sync pulse polarity is indicated by the 2-bit signal supplied by the sync decoder 4 to the decoding logic circuit 6.

As an alternative, the decoded clock frequency of the channel status information words supplied to the input terminal 1 may be used to provide the value of the sync distance by some external clock frequency detector, and so set the position of the window.

Returning to FIG. 2, when the decoding logic circuit 6 has found two sequential and alternating synchronizing patterns within plus or minus one bit period of the distance specified by the sync distance signal, a sync pulse is supplied to the variable delay device 9, which operates in dependence on the sync distance signal to supply the output sync pulse in synchronism with the start of the synchronizing signal pattern as supplied to the data output terminal 3 by way of the first delay device 2. The additional delay of X-bit periods effected by the first delay device 2 corresponds to any delay additional to the 57 and sixteen bit period delays of the second delay device 5 and the shift register 7, due to the decoding logic circuit 6 and associated circuits. The output sync pulses will then continue to be supplied so long as the synchronizing signals remain within plus or minus one bit period of the measured distance. If for any reason this condition ceases to be satisfied, then the apparatus will return to the startup condition described above.

Various modifications are of course possible without departing from the invention as defined by the appended claims. In particular, the invention is clearly applicable to other circumstances where the distance between successive synchronizing signals may vary. Moreover, the numbers of bits in the various signals and the range of bit periods over which the position of the synchronizing signals may vary can of course have different values.

We claim:

1. A method of decoding digital synchronizing signals each of which consists of a plurality of bits in a fixed pattern, wherein the intervals between the starts of successive said synchronizing signals in an input digital signal are variable over a range of P bit periods plus or minus Q bit periods, the method comprising the steps of:
    ascertaining the bit period distance between the starts of two successive said synchronizing signals, said step of ascertaining including first searching said input digital signal for two successive alternating synchronizing signal patterns;
    providing a window comprising said bit period distance, which window is varied in position if said bit period distance changes;
    subsequently searching said input digital signal for said pattern using said window; and
    supplying an output synchronizing pulse in synchronism with subsequent said synchronizing signals found in said window.

2. A method according to claim 1, wherein said window providing step includes providing a first window extending from P-Q bit periods to P+Q bit periods, said first search using said first window.

3. A method according to claim 2, wherein said window providing step includes providing a second window extending one bit period on each side of said bit period distance, said subsequent search using said second window.

4. A method according to claim 1, wherein said input digital signal is made up of one of channel status information bits and user bits in a digital audio data signal.

5. Apparatus for decoding digital synchronizing signals each of which consists of a plurality of bits in a fixed pattern, wherein the intervals between the starts of successive said synchronizing signals in an input digital signal are variable over a range of P bit periods plus or minus Q bit periods, the apparatus comprising:
    means for ascertaining the bit period distance between the starts of two successive said synchronizing signals, said ascertaining means including means for searching said input digital signal for two successive alternating synchronizing signal patterns prior to ascertaining said bit period distance;
    a window comprising said bit period distance, which window is varied in position if said bit period distance changes; means for subsequently searching said input digital signal for said pattern using said window; and
    means for supplying an output synchronizing pulse in synchronism with subsequent said synchronizing signals.

6. Apparatus according to claim 5, wherein said window is provided so as to extend one bit period on each side of said bit period distance, said subsequent search using said extended window.

* * * * *